US006708493B2

United States Patent
Mao et al.

(10) Patent No.: US 6,708,493 B2
(45) Date of Patent: Mar. 23, 2004

(54) VARIABLE RATIO OF FORCE-ENLARGEMENT MASTER CYLINDER OF A BRAKING SYSTEM

(75) Inventors: Yen-Chieh Mao, Kaohsiung (TW); Ching-Huan Tseng, 2F, No.5, Lane 1007, Ta Hsueh Rd. E. Dist., Hsinchu (TW)

(73) Assignee: Ching-Huan Tseng, Hsinchu (TW)

( * ) Notice: Subject to any disclaimer, the term of this patent is extended or adjusted under 35 U.S.C. 154(b) by 131 days.

(21) Appl. No.: 10/146,756

(22) Filed: May 16, 2002

(65) Prior Publication Data

US 2003/0184149 A1 Oct. 2, 2003

(30) Foreign Application Priority Data

Apr. 2, 2002 (TW) ....................... 91106666 A

(51) Int. Cl.[7] .................................. F15B 7/04
(52) U.S. Cl. ....................... 60/578; 188/24.15
(58) Field of Search ............... 188/24.11, 24.14, 188/24.15, 353; 60/578, 576, 574

(56) References Cited

U.S. PATENT DOCUMENTS

| | | | | |
|---|---|---|---|---|
| 2,343,900 A | * | 3/1944 | Groves | ....................... 60/576 |
| 3,554,334 A | * | 1/1971 | Shimano et al. | ............. 188/344 |
| 3,802,199 A | * | 4/1974 | Hagberg, Jr. | .................. 60/574 |
| 3,870,127 A | * | 3/1975 | Wilson et al. | ............ 188/24.15 |
| 4,086,770 A | * | 5/1978 | Shaw | ........................... 60/562 |
| 4,303,146 A | * | 12/1981 | Gaiser | ........................ 188/71.8 |
| 4,640,098 A | * | 2/1987 | Brademeyer et al. | .......... 60/578 |
| 4,665,701 A | * | 5/1987 | Bach | ........................... 60/547.1 |
| 4,665,803 A | * | 5/1987 | Mathauser | ...................... 92/99 |
| 5,557,935 A | * | 9/1996 | Ganzel | ........................... 60/578 |
| 5,722,240 A | * | 3/1998 | Castel | ........................... 60/577 |
| 5,983,637 A | * | 11/1999 | Lubbers et al. | ................ 60/549 |
| 6,085,523 A | * | 7/2000 | Buckley et al. | ................ 60/585 |

* cited by examiner

Primary Examiner—Jack Lavinder
Assistant Examiner—Benjamin A Pezzlo

(57) ABSTRACT

A variable ratio of force-enlargement master cylinder for a braking system is described. The variable ratio of force-enlargement master cylinder has a cylinder, an outer piston, and an inner piston, in which comprise a plurality of cavities and openings therein. When a force is uniformly applied to the variable ratio of force-enlargement master cylinder, the flow rate of the fluid is preferably changed into a predetermined value by incorporating the cavities and openings located on the cylinder, the outer piston, and the inner piston in a suitable time.

17 Claims, 4 Drawing Sheets

VARIABLE RATIO OF FORCE-ENLARGEMENT MASTER CYLINDER OF A BRAKING SYSTEM

FIELD OF THE INVENTION

The present invention generally relates to a braking device, and more particularly, to a variable ratio of force-enlargement master cylinder for a braking device of a bicycle.

BACKGROUND OF THE INVENTION

It is well known that a braking force generated from a friction pad of a rim brake system is used to halt a bicycle by clipping both wheel edges of the bicycle. However, the dust and moisture are easily accumulated on the surfaces of the wheel edges. Such a situation particularly occurs when the bicycle is ridden in a roadway covered with the mud or water. Therefore, operating circumstances of the friction pad go from bad to worse, resulting in many problems such as a brake performance reduction, or even the safety issues. Moreover, the cable is applied to transfer the braking force to the brake device at the wheel side. Since the cable will tend to be extended when the applied tension is too large when the braking lever is extremely pressed, the braking device will not give enough braking force in this situation.

To solve the above problems, a disc brake system 100 has been developed, as shown in FIG. 1. Braking fluid and the pipelines are used as the medium of transmitting the brake force to the braking devices. When the rider pulls the lever of the braking device with a force 102, the piston 104 in the braking device pushes the braking fluid through a guide tube 106. The braking fluid is pressed into a brake member 108 of the braking device to pull out the friction pad 112 to impel a piston 110 against a disc 114 of the brake member 108. The braking fluid, the single piston 104 and the piston 1 10 serve as transmission interface of the braking force in the disc brake system 100. A ratio of force-enlargement is defined as magnifying rate of a force between the single piston 104 and the piston 110. There is a need to increase the ratio of force-enlargement master cylinder.

If the cross-sectional area of the piston 104 and the piston 110 is reduced, the ratio of the force-enlargement is increased, which results in a reduction of braking force applied on the rider's hand. However, such a situation of cross-sectional area decrement of the piston 104 diminishes the flow rate of braking fluid in the piston 104 and the displacement of the piston 110 is decreased and thus leaded into the following drawbacks: (a) The piston 110 has an insufficient forward displacement. Even if the piston 104 is entirely pushed down, the piston 110 still cannot propel the friction pad 112 onto the brake disc 114, which leads to an inadequate force imposed on the braking system. (b) The piston 110 has an insufficient backward displacement. Even if the piston 104 is totally released, the piston 110 with the friction pad 112 still cannot be separated from the brake disc 114, which leads to abrasion, vibration, noise and human power dispersion.

Consequently, how to control the brake speed and the braking force of the braking device and how to increase the braking force and the high ratio of force-enlargement are important problems and are currently main issues for braking device manufacturers of the bicycles.

SUMMARY OF THE INVENTION

The primary object of the present invention is that a friction pad of a variable ratio of force-enlargement master cylinder rapidly attaches to the disc of the brake member to increase the manipulation of the bicycle when a lever is dragged down in the beginning.

Another object of the present invention is that the friction pad of the variable ratio of force-enlargement master cylinder is imposed at a higher normal force to increase the braking effect of vehicles.

According to the above objects, the present invention sets forth a variable ratio of force-enlargement master cylinder. The variable ratio of force-enlargement master cylinder comprises a cylinder, an outer piston and an inner piston. The cylinder comprises a first cavity which includes a first opening, second opening and third opening on the periphery of the first cavity. The first cavity is filled with fluid stored in a fluid supply device.

The first channel located inside a sidewall of the cylinder is connected to the second opening with the third opening. The fluid in the first cavity is transmitted into the brake member by the first channel of the cylinder to apply pressure to the friction pad serving as an imposition on the disc of the brake member.

The outer piston, hollow and cylindrical in shape, is coupled to the first cavity of the cylinder by a first resilient body to reciprocate along the first cavity. The outer piston has a second cavity and a second channel inside a sidewall. The second cavity is connected to the first cavity of cylinder via the second channel to fill the second cavity with the fluid. Moreover, the outer piston includes a fourth opening and a fifth opening on the surface region of the outer piston to drain the fluid outwardly. An annular recess is preferably positioned on a surface region adjacent to the fourth opening of the outer piston to drain the fluid passing through the annular recess via the first channel.

The inner piston coupled to the second cavity of the outer piston is allowed to reciprocate with a second resilient body between the outer piston and the inner piston along the second cavity. More significantly, the cross-section area of the inner piston is smaller than that of the outer piston along the axial center. When the rider applies force to the inner piston, the fluid stored in the first cavity of the cylinder is quickly exhausted at a higher speed to push the brake forward and then the friction pad is pressed onto the disc at a larger-than-normal force. In addition, the inner piston has a third channel therein to circulate the fluid around the variable ratio of force-enlargement master cylinder.

In the use of the variable ratio of force-enlargement master cylinder, if a lever of the braking device is pulled, the outer piston compresses the fluid within the first cavity of the cylinder. Both sides of the third channel are aligned with the second channel and the fourth opening of the outer piston, respectively. Also, the fifth opening is shielded with the sidewall of the cylinder so that the fluid passes sequentially through the first cavity, the second channel, the third channel and the fourth opening. Finally, the fluid exhausts from the first channel to transfer hydraulic pressure to the friction pad of the brake member.

The friction pad of the braking member is propelled by the fluid with a higher speed to serve as the step of "fast approaching". Therefore, the friction pad rapidly contacts the disc to increase the manipulation of the bicycle.

If the rider continuously presses the lever, the outer piston propels the fluid within the first cavity until the bottom of the outer piston contacts the bottom of the first cavity. Also, the third opening of the cylinder aligns with the fifth opening of the outer piston. Meanwhile, the fluid in the second cavity of the outer piston flows through the fifth opening of the outer piston and the third opening of the cylinder. Afterward, the fluid later is drained away from the first channel of the cylinder.

In contrast with the step of fasting approaching, because the effective cross-area of the inner piston is smaller than that of the outer piston, the fluid within the second cavity moves at a lower speed and at a higher pressure. Consequently, a higher pressure is transmitted into the friction pad to increase the normal force applied to the disc, which is a step of "high pressure" to increase the variable ratio of force-enlargement.

In summary, the variable ratio of force-enlargement master cylinder makes the friction pad rapidly attach to the disc to reduce the braking time. After the friction pad contacts the disc, the friction pad continuously presses the disc at a higher-than-normal force to increase the variable ratio of force-enlargement.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a variable ratio of force-enlargement master cylinder to improve the shortcomings of a braking device applied to bicycles in the prior art. A fluid filled within the variable ratio of force-enlargement master cylinder is transmitted into a brake member of the braking device to push a friction pad so that the bicycle is effectively halted. The variable ratio of force-enlargement master cylinder in the present invention is also preferably used to a variety of braking devices of vehicles.

The main theory of the variable ratio of force-enlargement master cylinder in the present invention is based on some factors including a brake torque (T), a brake force between the friction pad and a disc, and the equivalent brake radius of the friction pad on the disc, as shown in the following equation:

$$T=Fr=(\mu N)r=\mu(PA)r$$

where

T is the brake torque;

F is the brake force between the friction pad and the disc;

r is the equivalent friction radius of the friction pad opposed against the disc;

$\mu$ is the friction coefficient;

N is the normal force which the friction pad opposes against the disc;

P is the fluid pressure imposed on pistons of the braking device; and

A are the effective area of the pistons.

In view of the above-mentioned, if the brake torque need to be enlarged, the value of these items including P, A, r, or $\mu$ must be increased. However, $\mu$ is concerned with the material of the friction pad and the disc and r is concerned with the size of the braking components. As a result, in the present invention, the A area of the pistons is allowed to be changed to vary the P pressure so that the pistons in the variable ratio of force-enlargement master cylinder are sequentially propelled at a higher speed or variable ratio of force-enlargement. In the preferred embodiment of the present invention, two or more pistons are used to improve the single piston of the prior art.

Figure 1:
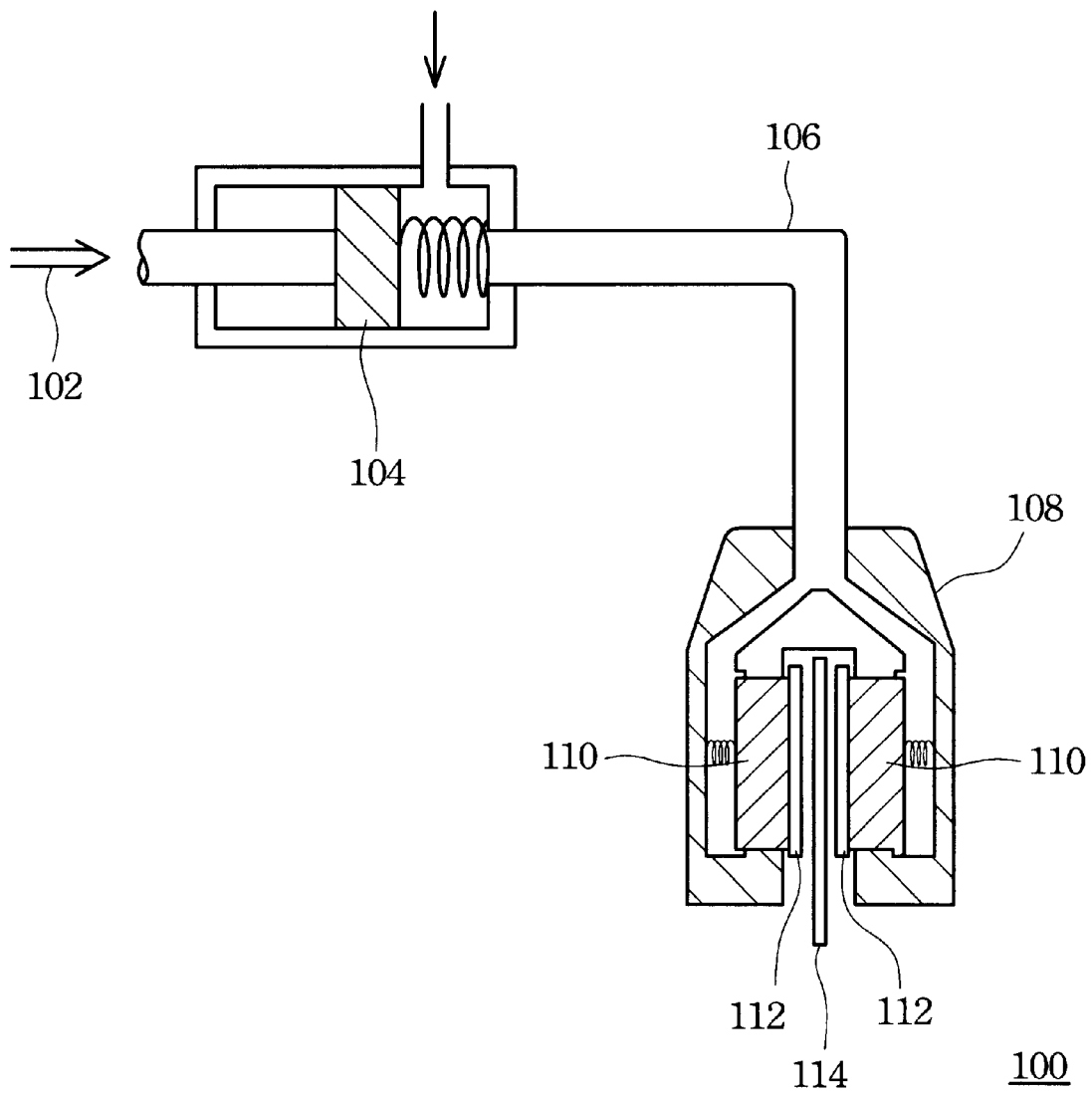
FIG. 1 illustrates a brake disc of a bicycle device according to the prior art.
Figure 2:
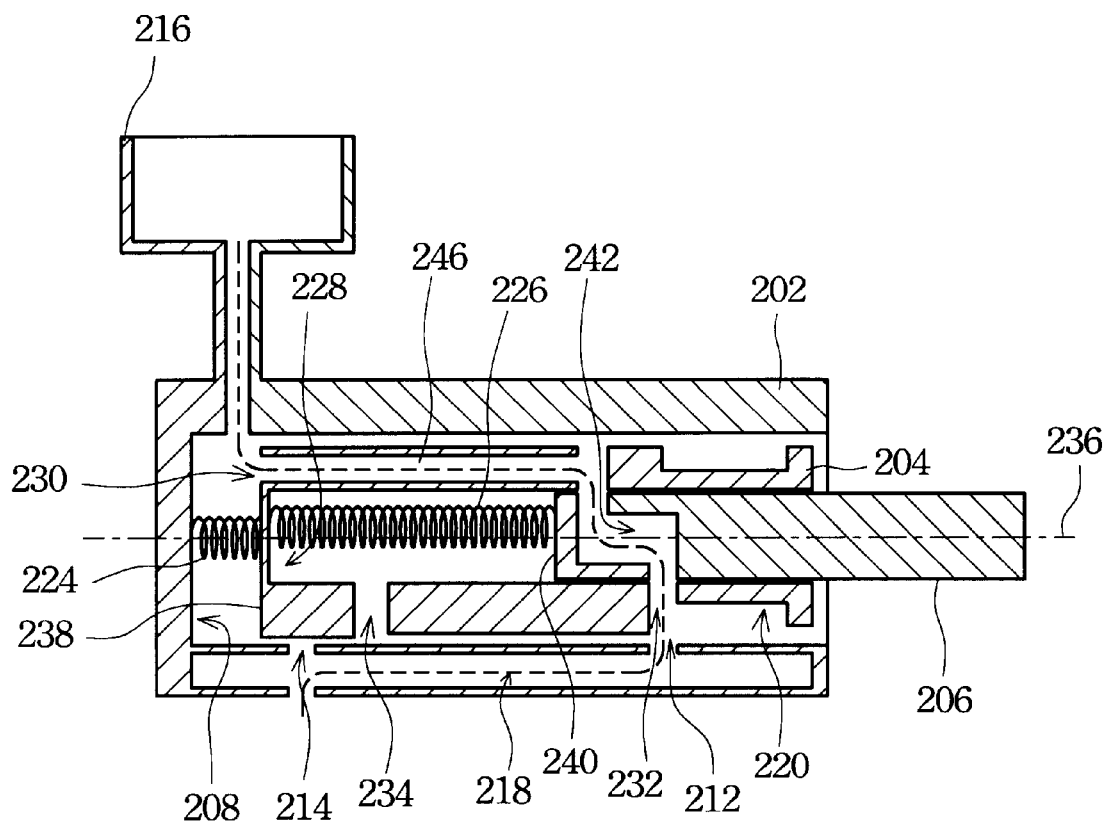
FIG. 2 illustrates a cross-sectional view of a variable ratio of force-enlargement master cylinder according to the present invention.

FIG. 2 shows a cross-sectional view of a variable ratio of force-enlargement master cylinder according to the present invention. The variable ratio of force-enlargement master cylinder 200 comprises a cylinder 202, an outer piston 204 and an inner piston 206. The cylinder 202, a hollow column in shape, comprises a first cavity 208 which includes a first opening 210, second opening 212 and third opening 214 on the periphery of the first cavity. The first cavity 208 is filled with fluid stored in a fluid supply device 216, such as an oil bowl or a chamber via the first opening.

A first channel 218 located inside a sidewall of the cylinder 202 connects the second opening 212 with the third opening 214. The fluid in the first cavity 208 is transmitted into a brake member by the first channel 218 of the cylinder 202 to apply pressure to the friction pad serving as an imposition on the disc of the brake member.

The outer piston 204, hollow and cylindrical in shape, is coupled to the first cavity 208 of the cylinder 202 by a first resilient body 224 to reciprocate along the first cavity 208. The first resilient body 224, such as a compressible spring, preferably connects the bottom of the cylinder 202 with the bottom of the outer piston 204. The outer piston 204 also has a second cavity 228 and a second channel 230 inside a sidewall of the outer piston 204. The second cavity 228 is connected to the first cavity 208 of the cylinder 202 via the second channel 230 to fill the second cavity 228 with the fluid. Moreover, the outer piston 204 includes a fourth opening 232 and a fifth opening 234 on the surface region of the outer piston 204 to drain the fluid outwardly. In the preferred embodiment of the present invention, an annular recess 220 is positioned on a surface region adjacent to the fourth opening 232 of the outer piston 204 to drain the fluid passing through the annular recess 220 via the first channel 218 of the cylinder 202.

The inner piston 206, columnar, square, or the like in shape, which is coupled to the second cavity 228 of the outer piston 204, is allowed to reciprocate with a second resilient body 226 between the outer piston 204 and the inner piston 206 along the second cavity 228. The second resilient body 226, such as a compressible spring, preferably connects the bottom of the outer piston 204 with the bottom of the inner piston 206. More importantly, the cross-section area 240 of the inner piston 206 is smaller than cross-section area 238 of the outer piston 240 along an axial center 236. When the rider applies a force to the inner piston 206, the fluid stored in the first cavity 208 of the cylinder 204 is quickly exhausted at a higher speed to push the friction pad forward and then the friction pad is pressed onto the disc at a larger-than-normal force. In addition, the inner piston 206 has a third channel 242 therein to circulate the fluid around the variable ratio of force-enlargement master cylinder 200.

Furthermore, when the variable ratio of force-enlargement master cylinder 200 is in an idle status, inactive brake, the fluid stored in the fluid supply device 216 is injected into the first cavity 208 and flows the outer piston 204 and the third channel 242 of the inner piston 206. Finally, the fluid is drained away from the first channel 218 of the outer piston 204. In other words, the fluid passes through the first direction 246 to communicate the fluid between the fluid supply device 216 and the brake member to recover the stroke of the piston due to the abrasion of the friction pad.

Figure 3:
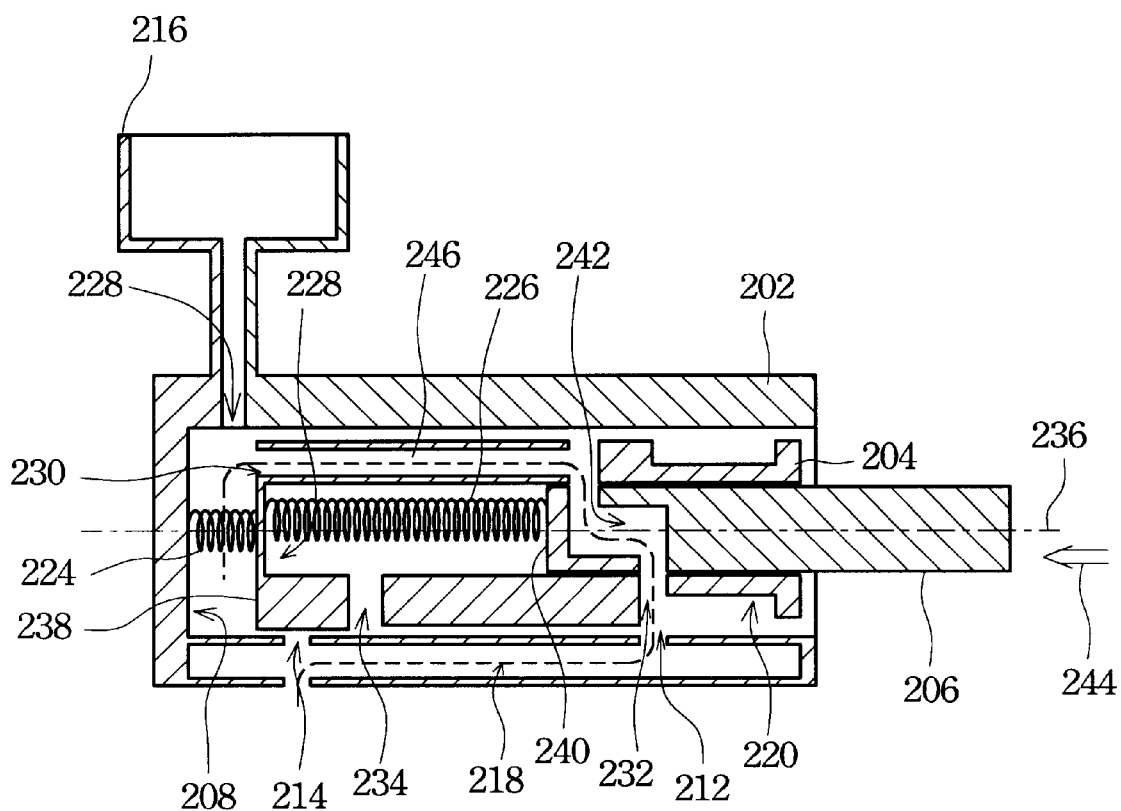
FIG. 3 illustrates a cross-sectional view of a variable ratio of force-enlargement master cylinder whose fluid is transmitted at a higher speed according to the present invention.

FIG. 3 shows a cross-sectional view of the variable ratio of force-enlargement master cylinder whose fluid is transmitted at a higher speed according to the present invention. If a lever of the braking device is pulled, the outer piston 204 compresses the fluid within the first cavity 208 of the cylinder 202. Both sides of the third channel 242 are aligned with the second channel 230 and the fourth opening 232 of the outer piston 204, respectively. Also, the fifth opening 234 is shielded with the sidewall of the cylinder 202 so that the fluid passes sequentially through the first cavity 208, the second channel 230, the third channel 242 and the fourth opening 232. Finally, the fluid exhausts from the first channel 218 to transfer hydraulic pressure to the friction pad of the brake member.

Specifically, when the rider slightly pulls the lever, the first cavity 208 is pressed by the cross-section area 238 of the outer piston to increase the flow rate of the fluid passing through the first channel 218. As a result, due to the higher fluid rate, the friction pad rapidly comes near the disc to serve as a step of "fast approaching". For the same stroke of the lever, the friction pad is allowed to approach the disc since the fluid exhausts at a high speed. Therefore, the friction pad rapidly contacts the disc in the beginning to reduce greatly the movement of the lever, which increases the manipulation of the bicycle.

In the preferred embodiment of the present invention, a distance of the annular recess 220 of the outer piston 204 along the axial center 236 is equal to or more than that between the third opening 214 of the cylinder and the fifth opening 234 of the outer piston 204. In the "fast approaching" step, the fluid passed through the fourth opening always exhausts from the first channel 218 of the cylinder 202.

Additionally, in the preferred embodiment of the present invention, the fluid sequentially flows into the first cavity 208 and second cavity 228 to conserve sufficient fluid when the lever is pressed. Specifically, the fluid flows along the second direction 248.

Figure 4:
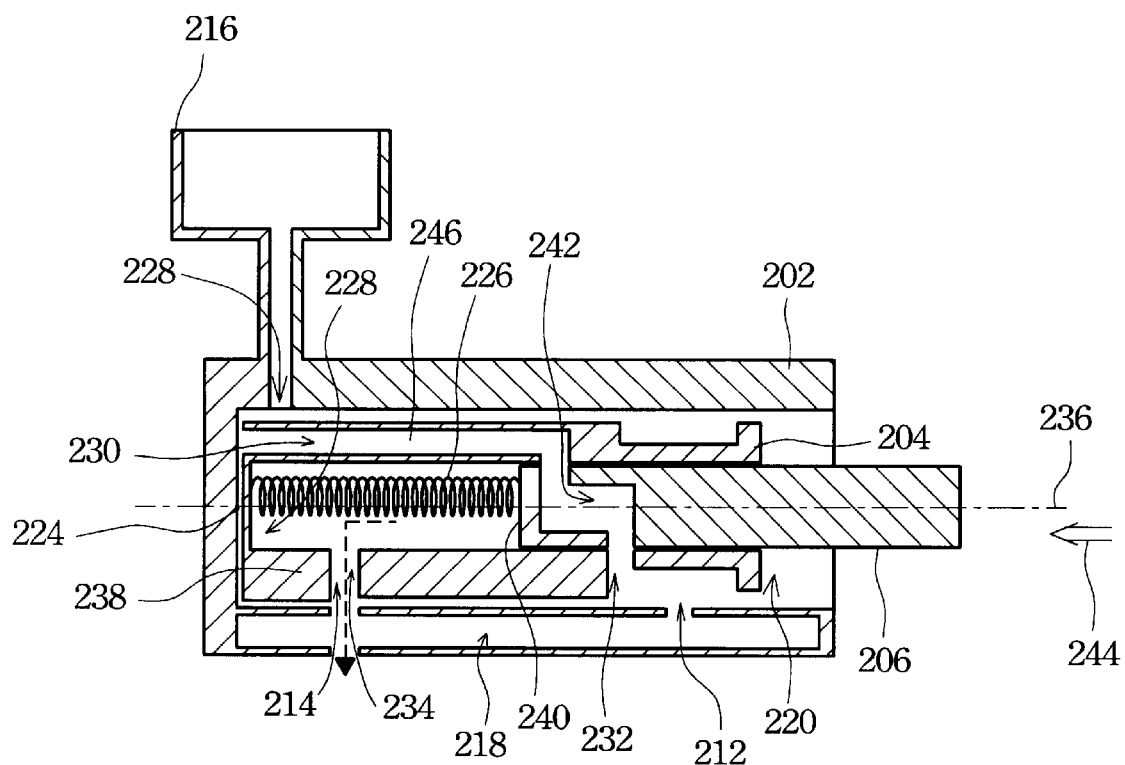
FIG. 4 illustrates a cross-sectional view of a variable ratio of force-enlargement master cylinder whose fluid is transmitted at a higher pressure according to the present invention.

FIG. 4 shows a cross-sectional view of a variable ratio of force-enlargement master cylinder whose fluid is transmitted at a higher pressure according to the present invention. If the rider continuously pulls the lever of the braking device, the outer piston 204 propels the fluid within the first cavity 208 until the bottom of the outer piston 204 contacts the bottom of the first cavity 208. Also, the third opening 214 of the cylinder 202 aligns with the fifth opening 234 of the outer piston 204. Meanwhile, the fluid in the second cavity 228 of the outer piston 204 flows through the fifth opening 234 of the outer piston 204 and the third opening 214 of the cylinder 202. The fluid later is drained away from the first channel 218 of the cylinder 202. In other words, the fluid flows along the third direction 250.

Therefore, after the friction pad attaches to the disc, the inner piston 206 moves along the first cavity 208 of the outer piston 204 if the rider continuously imposes a force on the inner piston 206. In contrast with the step of "fasting approaching", the fluid within the second cavity 228 moves at a lower speed and at a higher pressure because the effective cross-area 238 of the inner piston 206 is smaller than that 240 of the outer piston 206. Consequently, a higher pressure is transmitted into the friction pad to increase the normal force applied to the disc, which is a step of "high pressure" to increase the variable ratio of force-enlargement.

According to the above-mentioned, when an rider pulls the lever of the bicycle, the outer piston of the variable ratio of force-enlargement master cylinder is able to move rapidly so that the stroke of lever completes much early to reduce the brake time. After the friction pad contacts the disc, the friction pad presses the disc at a higher-than-normal force to increase the variable ratio of force-enlargement. As a result, the present invention solves the problem of a long brake stroke and insufficient brake force.

As understood by a person skilled in the art, the foregoing preferred embodiments of the present invention are illustrations rather than limitations of the present invention. It is intended that they cover various modifications and similar arrangements included within the spirit and scope of the appended claims, the scope of which should be accorded the broadest interpretation so as to encompass all such modifications and similar structure.

What is claimed is:

1. A variable ratio of force-enlargement master cylinder for transmitting a brake force into a braking device by a fluid, said variable ratio of force-enlargement master cylinder comprising:

a cylinder having a first cavity, wherein the first cavity includes a first opening, second opening and third opening therein, said first cavity is filled with the fluid via said first opening, a first channel is positioned inside a sidewall of said cylinder, and said first channel connects said second opening with said third opening for transmitting the brake force;

an outer piston coupled to said first cavity of said cylinder by using a first resilient body for reciprocal motion along said first cavity, said outer piston having a second cavity and a second channel therein, said second cavity connected to said first cavity of said cylinder via said second channel for filling said second cavity with the fluid, said outer piston having a fourth opening and a fifth opening therein for draining the fluid outwardly; and an inner piston coupled to said second cavity of said outer piston by using a second resilient body for reciprocal motion along said second cavity, said inner piston having a third channel therein for circulating the fluid around the braking device, a first cross region of said inner piston being smaller than a second cross region of said outer piston along an axial center, said third channel of said inner piston being aligned with said second channel and said fourth opening of said outer piston, respectively, and said fifth opening being shielded with the sidewall of said cylinder such that the fluid sequentially circulates into said second channel, said third channel and fourth opening, and drains away via said first channel.

2. The variable ratio of force-enlargement master cylinder of claim 2, wherein said outer piston contacts an end of said first cavity of said cylinder and said third opening of said outer piston aligns with said fifth opening of said inner piston such that the fluid within said second cavity of said outer piston sequentially circulates into said fifth opening of said outer piston and said third opening of said cylinder, and drains away via said first channel of said cylinder.

3. The variable ratio of force-enlargement master cylinder of claim 2, further comprising a fluid supply device connected to said first opening of said cylinder.

4. The variable ratio of force-enlargement master cylinder of claim 2, wherein said first resilient body comprises a compressible spring.

5. The variable ratio of force-enlargement master cylinder of claim 2, wherein said second resilient body comprises a compressible spring.

6. The variable ratio of force-enlargement master cylinder of claim 2, further comprising an annular recess on a surface of said outer piston.

7. The variable ratio of force-enlargement master cylinder of claim 6, wherein a first length of said annular recess of said outer piston along the axial center is equal to a second length between said third opening of said cylinder and said fifth opening of said outer piston along the axial center.

8. The variable ratio of force-enlargement master cylinder of claim 6, wherein a first length of said annular recess of said outer piston along the axial center is greater than a second length between said third opening of said cylinder and said fifth opening of said outer piston along the axial center.

9. A variable ratio of force-enlargement master cylinder for transmitting brake force into a braking device of a bicycle by a fluid to stop the bicycle, said variable ratio of force-enlargement master cylinder comprising:

a cylinder having a first cavity, wherein the first cavity includes a first opening, second opening and third opening therein, said first cavity is filled with the fluid via said first opening, a first channel is positioned inside a sidewall of said cylinder, and said first channel connects said second opening with said third opening for transmitting the brake force;

an outer piston coupled to said first cavity of said cylinder by using a first resilient body for reciprocal motion along said first cavity, said outer piston having a second cavity and a second channel therein, said second cavity connected to said first cavity of said cylinder via said second channel for filling said second cavity with the fluid, said outer piston having a fourth opening and a fifth opening thereon for draining the fluid outwardly; and an inner piston coupled to said second cavity of said outer piston by using a second resilient body for reciprocal motion along said second cavity, and said inner piston having a third channel therein for circulating the fluid around the braking device, a first cross region of said inner piston being smaller than a second cross region of said outer piston along an axial center.

10. The variable ratio of force-enlargement master cylinder of claim 9, wherein said third channel of said inner piston aligns with said second channel and said fourth opening of said outer piston, respectively, and said fifth opening is shielded with the sidewall of said cylinder such that the fluid sequentially circulates into said second channel, said third channel and fourth opening, and drains away via said first channel.

11. The variable ratio of force-enlargement master cylinder of claim 9, wherein said outer piston makes contact with an end of said first cavity of said cylinder and said third opening of said outer piston aligns with said fifth opening of said inner piston such that the fluid within said second cavity of said outer piston sequentially circulates into said fifth opening of said outer piston and said third opening of said cylinder, and drains away via said first channel of said cylinder.

12. The variable ratio of force-enlargement master cylinder of claim 9, further comprising a fluid supply device connected to said first opening of said cylinder.

13. The variable ratio of force-enlargement master cylinder of claim 9, wherein said first resilient body comprises a compressible spring.

14. The variable ratio of force-enlargement master cylinder of claim 9, wherein said second resilient body comprises a compressible spring.

15. The variable ratio of force-enlargement master cylinder of claim 9, further comprising an annular recess in a surface of said outer piston.

16. The variable ratio of force-enlargement master cylinder of claim 15, wherein a first length of said annular recess of said outer piston along the axial center is equal to a second length between said third opening of said cylinder and said fifth opening of said outer piston along the axial center.

17. The variable ratio of force-enlargement master cylinder of claim 15, wherein a first length of said annular recess of said outer piston along the axial center is greater than a second length between said third opening of said cylinder and said fifth opening of said outer piston along the axial center.

* * * * *